US008802231B2

(12) United States Patent
Funayama et al.

(10) Patent No.: US 8,802,231 B2
(45) Date of Patent: Aug. 12, 2014

(54) INSULATING COATING MATERIAL AND INSULATED WIRE USING THE SAME

(75) Inventors: Yasuhiro Funayama, Hitachi (JP); Hideyuki Kikuchi, Hitachi (JP); Yuki Honda, Hitachi (JP)

(73) Assignees: Hitachi Metals, Ltd., Tokyo (JP); Hitachi Magnet Wire Corp., Tokyo (JP)

( * ) Notice: Subject to any disclaimer, the term of this patent is extended or adjusted under 35 U.S.C. 154(b) by 132 days.

(21) Appl. No.: 13/372,674

(22) Filed: Feb. 14, 2012

(65) Prior Publication Data

US 2012/0241191 A1 Sep. 27, 2012

(30) Foreign Application Priority Data

Mar. 22, 2011 (JP) .................................. 2011-062642

(51) Int. Cl.
*H01B 7/00* (2006.01)
*C08K 9/08* (2006.01)
(52) U.S. Cl.
USPC ............ 428/379; 523/200; 523/205; 523/213
(58) Field of Classification Search
USPC ........................... 523/200, 205, 213; 428/379
See application file for complete search history.

(56) References Cited

U.S. PATENT DOCUMENTS

2009/0120659 A1 5/2009 Obika
2009/0176961 A1 7/2009 Kikuchi et al.

FOREIGN PATENT DOCUMENTS

| JP | 2001011372 A | * | 1/2001 |
| JP | 2003-192910 | | 7/2003 |
| JP | 2004-339251 A | | 12/2004 |
| JP | 2005-203334 A | | 7/2005 |
| JP | 2005-239765 | | 8/2005 |
| JP | 2006-302835 A | | 11/2006 |
| JP | 2007-141507 A | | 6/2007 |
| JP | 2008-257925 A | | 10/2008 |
| WO | 2006098409 A1 | | 9/2006 |

OTHER PUBLICATIONS

Derwent abstract 1973-71122U for JP 48-45899, Jul. 24, 1978.*

* cited by examiner

*Primary Examiner* — Vickey Nerangis
(74) *Attorney, Agent, or Firm* — Roberts Mlotkowski Safran & Cole, P.C.

(57) ABSTRACT

An insulating coating material includes a polyamide-imide resin insulating coating material, and surface-treated inorganic fine particles dispersed in the polyamide-imide resin insulating coating material. A viscosity measured by an E-type viscometer is 1000 to 4000 mPa·s at 30° C. and at a shear rate of 200 s−1 and 4000 to 12000 mPa·s at 30° C. and at a shear rate of 1 s−1. An insulated wire includes a rectangular conductor, and an insulating layer formed on the rectangular conductor and including the insulating coating material.

5 Claims, 1 Drawing Sheet

INSULATING COATING MATERIAL AND INSULATED WIRE USING THE SAME

The present application is based on Japanese patent application No. 2011-062642 filed on Mar. 22, 2011, the entire contents of which are incorporated herein by reference.

BACKGROUND OF THE INVENTION

1. Field of the Invention

The invention relates to an insulating coating material and an insulated wire using the insulating coating material, in particular, to an insulating coating material that pseudoplasticity is imparted to a polyamide-imide resin insulating coating material, and an insulated wire using the insulating coating material.

2. Description of the Related Art

A rectangular enameled wire composed of a conductor having a rectangular cross section (rectangular conductor) and an insulating layer formed thereon by applying and baking an insulating coating material is desired to have characteristics as an insulated wire, such as flexibility, abrasion resistance and softening resistance, etc., and also to have a the insulation layer which is formed to have a uniform thickness throughout the entire circumference of the conductor so as not to have thin portions in light of electrical characteristics, etc.

In order to facilitate uniform coating on a conductor having a circular cross section, an insulating coating material used for an enameled wire, such as a polyamide-imide resin insulating coating material, is generally adjusted to have a relatively low viscosity so as not to inhibit the effect of surface tension by which the insulating coating material makes a shape having a circular cross section on the conductor. On the other hand, the higher the viscosity of the insulating coating material, the smaller the surface tension effect of the insulating layer and also the longer it takes to become a shape having a circular cross section, hence, the insulating coating material on the conductor keeps a shape of a coating die.

A coating technology to reduce a film thickness per coating application is attempted to uniformly apply an existing polyamide-imide resin insulating coating material to a rectangular conductor, however, it requires many coating applications to have a thick coating and the thicker coating has more remarkable unevenness in thickness. Meanwhile, although a technique of applying a hydrosoluble polymer, etc., by electrodeposition coating is known, this technique is to address thin film coatings and has a difficulty to coat a thick insulating layer (e.g., coating of not less than 20 μm in a thickness).

As described above, although improvement in a coating technique has been sought to address the demand for uniform application of polyamide-imide resin insulating coating material on a rectangular conductor, coating materials have not been improved yet.

Patent Literatures

Patent Literature 1: JP-A-2004-339251, Patent Literature 2: WO 2006/098409, Patent Literature 3: JP-A-2007-141507, Patent Literature 4: JP-A-2008-257925, Patent Literature 5: JP-A-2006-302835, Patent Literature 6: Japanese patent No. 4177295

SUMMARY OF THE INVENTION

In general, when an insulating coating material formed of a polyamide-imide resin insulating coating material, etc., is applied and baked on a conductor having a non-circular cross section such as rectangular conductor, an insulating layer having non-uniform thickness is formed on the rectangular conductor such that a layer formed on a flat portion adjacent to corner portions becomes thicker due to surface tension of the resin coating material and a layer formed on the corner portions and in the vicinity of the center of the flat portion become thin, and a portion having low breakdown voltage is thus present.

Especially in an insulated wire used for electrical equipment which are driven by an inverter control, a thin portion partially present on the insulating layer formed on the rectangular conductor causes partial discharge to occur at the thin film portion due to inverter surge voltage (also called "surge voltage"), which deteriorates the insulating layer.

Accordingly, it is attempted to reduce unevenness of coating material due to surface tension by thinning an application thickness per coating application in order to form an insulating layer having a uniform thickness on a rectangular conductor, however, such a method deteriorates coating workability.

It is an object of the invention to provide an insulating coating material that prevents unevenness of coating material at the time of forming an insulation layer on a rectangular conductor without deteriorating coating workability and allows a high quality insulating layer without unevenness in film thickness to be obtained, and an insulated wire using the insulating coating material.

(1) According to one embodiment of the invention, an insulating coating material comprises:
 a polyamide-imide resin insulating coating material; and
 surface-treated inorganic fine particles dispersed in the polyamide-imide resin insulating coating material;
 wherein a viscosity measured by an E-type viscometer is 1000 to 4000 mPa·s at 30° C. and at a shear rate of 200 s−1 and 4000 to 12000 mPa·s at 30° C. and at a shear rate of 1 s−1.

In the above embodiment (1) of the invention, the following modifications and changes can be made.

(i) The inorganic fine particles are surface-treated with silicone oil having a molecular weight of 2000 to 25000.

(ii) The inorganic fine particles are dispersed in a range of 5 to 30 mass % with respect to a resin content of the polyamide-imide resin insulating coating material.

(iii) The inorganic fine particles comprise a silica fine particle.

(iv) The silica fine particle has an average primary particle diameter of less than 50 nm and dispersed at a ratio of 5 to 25 parts by mass per 100 parts by mass of the polyamide-imide resin.

(v) The polyamide-imide resin insulating coating material comprises an organic solvent, and a polyamide-imide resin obtained by reacting an aromatic diamine component comprising aromatic diamine having three or more aromatic rings with an aromatic diisocyanate component and an acid component including aromatic tricarboxylic acid anhydride.

(2) According to another embodiment of the invention, an insulated wire comprises:
 a rectangular conductor; and
 an insulating layer formed on the rectangular conductor and comprising an insulating coating material comprising a polyamide-imide resin insulating coating material having a viscosity of 1000 to 4000 mPa·s at 30° C. and at a shear rate of 200 s−1 and 4000 to 12000 mPa·s at 30° C. and at a shear rate of 1 s−1 when measured by an E-type viscometer.

Effects of the Invention

According to one embodiment of the invention, an insulating coating material can be provided that prevents unevenness of coating material at the time of forming an insulation layer on a rectangular conductor without deteriorating coating workability and allows a high quality insulating layer without unevenness in film thickness to be obtained. An insulated wire using the insulating coating material can be also provided.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Figure 1:
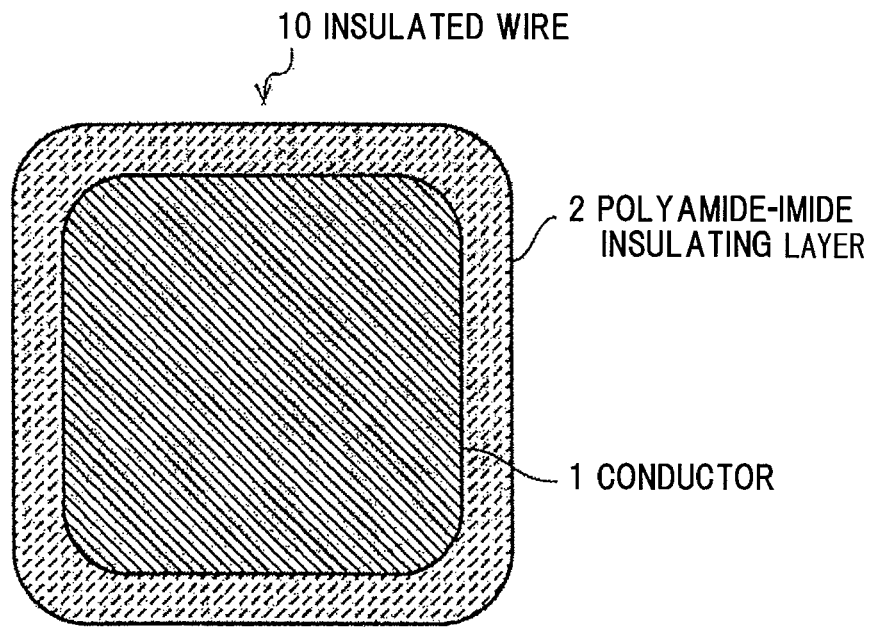
FIG. 1 is a cross sectional view showing an exemplary structure of an insulated wire in an embodiment of the present invention.

A preferred embodiment of the invention will be described below.

The inventors focused on viscosity of insulating coating material at the time of applying the insulating coating material on a rectangular conductor, and confirmed that an insulating layer tends to be thin due to degradation in coatability of the insulating coating material to a conductor and that dimensional accuracy of the rectangular conductor is significantly decreased due to tension generated when squeezing the insulating coating material by a coating die, which results in that an insulating layer having non-uniform thickness is formed throughout the entire circumference of the rectangular conductor.

In the invention which was made based on such verification, since surface-treated inorganic fine particles are dispersed in a polyamide-imide resin insulating coating material and use of an insulating coating material of which viscosity measured by an E-type viscometer is 1000 to 4000 mPa·s at 30° C. and at a shear rate of 200 $s^{-1}$ and is 4000 to 12000 mPa·s at 30° C. and at a shear rate of 1 $s^{-1}$ imparts pseudoplasticity to the insulating coating material, it is possible to suppress unevenness of coating material at the time of forming an insulation layer on a rectangular conductor without deteriorating coating workability, thereby obtaining a high quality insulating layer without unevenness in film thickness.

Since pseudoplasticity is imparted to the insulating coating material, viscosity of the insulating coating material is low when being sheared by a coating die at the time of application mainly to a rectangular conductor and the viscosity of the insulating coating material immediately becomes high after passing through the coating die due to reduction in shearing, hence, it is possible to keep the shape of the coating die. Compared to an insulating coating material to which pseudoplasticity is not imparted, it takes long time until throwing power of an insulating coating layer becomes non-uniform and it is thus possible to form an insulating layer by baking in a hardening furnace (baking furnace) while the insulating covering layer is uniformly formed. Accordingly, it is also possible to form a uniform layer on a conductor having a rectangular shape. Therefore, it is desirable that pseudoplasticity be imparted to an insulating coating material.

Next, each component used for the insulating coating material in the invention will be described.

Polyamide-Imide Resin Insulating Coating Material

For the insulating coating material of the embodiment, a polyamide-imide resin insulating coating material is desirably obtained by decarboxylation reaction, in the presence of an organic solvent, of an aromatic diisocyanate component with an imide group containing dicarboxylic acid (prepolymer) which is obtained by dehydration ring closure reaction of an aromatic diamine component formed of divalent aromatic diamine having three or more aromatic rings with an acid component containing aromatic tricarboxylic acid anhydride using an azeotropic solvent.

Aromatic Diamine Component

Use of divalent aromatic diamine having three or more aromatic rings as an aromatic diamine component and dehydration ring closure reaction of the aromatic diamine component with an acid component using an azeotropic solvent allow an abundance ratio of amide group to imide group in polymer, which mostly affects an increase in the dielectric constant of the polyamide-imide resin, to be reduced more efficiently than the conventional art. Accordingly, it is possible to obtain an excellent polyamide-imide resin insulating coating material in which the dielectric constant is reduced without deteriorating characteristics of polyamide-imide resin, such as heat resistance, etc.

The divalent aromatic diamine having three or more aromatic rings is made of at least one selected from, e.g., 2,2-bis[4-(4-aminophenoxy)phenyl]propane, bis[4-(4-aminophenoxy)phenyl]sulfone, bis[4-(4-aminophenoxy)phenyl]ether, 9,9-bis(4-aminophenyl)fluorene, 4,4'-bis(4-aminophenoxy) biphenyl and 1,4-bis(4-aminophenoxy) benzene, or isomers thereof. Alternatively, it is possible to use diisocyanate which is changed from a portion of the above listed divalent aromatic diamines having three or more aromatic rings by using phosgene with the base aromatic diamine.

Aromatic Diisocyanate Component

Aromatic diisocyanates such as, e.g., 4,4'-diphenylmethane diisocyanate (MDI), 2,2-bis[4-(4-isocyanatephenoxy)phenyl]propane (BIPP), tolylene diisocyanate (TDI), naphthalene diisocyanate, xylylene diisocyanate, biphenyl diisocyanate, diphenyl sulfone diisocyanate and diphenyl ether diisocyanate, etc., and isomers and multimeric complexes thereof are exemplified as the aromatic diisocyanate component. Alternatively, aliphatic diisocyanates such as hexamethylene diisocyanate, isophorone diisocyanate, dicyclohexylmethane diisocyanate and xylene diisocyanate, etc., or alicyclic diisocyanates to which the above exemplified aromatic diisocyanate is hydrogenated and isomers thereof may be combined with the above aromatic diisocyanate, if required.

Acid Component

The acid components include trimellitic anhydride (TMA). Although it is possible to use aromatic tricarboxylic acid anhydride such as benzophenone tricarboxylic acid anhydride, TMA is the most preferable.

In addition, the acid component may include tetracarboxylic dianhydride. The tetracarboxylic dianhydride includes, e.g., pyromellitic dianhydride (PMDA), 3,3',4,4'-benzophenone-tetracarboxylic dianhydride (BTDA), 3,3',4,4'-diphenyl sulfone-tetracarboxylic dianhydride (DSDA), 4,4'-oxydiphthalic dianhydride (ODPA), 3,3',4,4'-biphenyltetracarboxylic dianhydride, 4,4'-(2,2-hexafluoroisopropylidene) bis(phthalic anhydride) and 2,2-bis[4-(dicarboxyphenoxy) phenyl]propane dianhydride (BPADA), etc. It is preferable that a monomer having a large molecular weight (weight-average molecular weight: Mw) (e.g., a monomer having a weight-average molecular weight of not less than 400) be contained in the acid component in order to obtain an insulating layer having a high partial discharge inception voltage. Alternatively, alicyclic tetracarboxylic dianhydride to which the above aromatic tetracarboxylic dianhydride is hydrogenated may be combined, if required. Note that, although use of aliphatic materials reduces dielectric constant and high partial discharge inception voltage can be expected, blending quantity and combination need to be carefully determined since it may deteriorate heat resistance.

Azeotropic Solvent and Organic Solvent

Examples of the azeotropic solvent used for synthesis reaction of the aromatic diamine component with the acid component include aromatic hydrocarbon such as, e.g, toluene, benzene, xylene and ethyl benzene, etc., and xylene is especially preferable.

As the organic solvent used for manufacturing the polyamide-imide resin insulating coating material, it is possible to use an organic solvent of which prime solvent is NMP (N-methyl-2-pyrrolidone), etc. Besides NMP as a prime solvent, an organic solvent which does not inhibit synthesis reaction of the polyamide-imide resin, such as γ-butyrolactone, DMAC (N,N-dimethylacetamide), DMF (N,N-dimethylformamide), DMI (dimethylimidazolidinone), cyclohexanone and methylcyclohexanone, etc., may be combined or diluted. In addition, aromatic alkyl benzenes may be combined in order to dilute. In this regard, however, a risk of deterioration in solubility of the polyamide-imide resin insulating coating material needs to be taken into consideration.

For synthesizing the polyamide-imide resin insulating coating material, a reaction catalyst such as amines, imidazoles or imidazolines may be used without impairing stability of the coating material. In addition, a sealant such as alcohol may be used for terminating the synthesis reaction. Meanwhile, a blending ratio of the aromatic diisocyanate component for the synthesis of the polyamide-imide resin insulating coating material is not specifically limited, however, it is desirable that the amount of the imide group containing dicarboxylic acid formed by the first synthesis reaction be equal to the amount of the aromatic diisocyanate component. Alternatively, the aromatic diisocyanate component of 1 to 1.05 times the molar quantity of the acid component may be blended for the synthesis. In addition, a reaction temperature for the synthesis reaction of the aromatic diamine component with the acid component is 160° C. to 200° C., and preferably, about 170° C. to 190° C. Meanwhile, the reaction temperature for the synthesis reaction of the imide group containing dicarboxylic acid with the aromatic diisocyanate component is preferably about 110° C. to 130° C.

Pseudoplasticity-Imparting Agent

A pseudoplasticity-imparting agent (inorganic fine particle) is not specifically limited, and at least one material selected from the group consisting of silicon compound such as hydrophobic silica or hydrophilic silica, metal, glass, carbon black and metal complex is preferably used. In detail, the organic fine particle of, e.g., copper, silver, nickel, palladium, alumina, zirconia, titanium oxide, barium titanate, alumina nitride, silicon nitride, boron nitride, silicate glass, lead glass, inorganic glass such as $CaO.Al_2O_3.SiO_2.MgO.LiO_2$, low-melting-point glass, silicon compound, various carbon blacks and metal complex, etc., are included.

It is possible to effectively obtain pseudoplasticity and an increase in viscosity by using a silica fine particle (average primary particle diameter: not more than 50 nm) as an inorganic fine particle which is surface-treated with silicone oil having a molecular weight of 2000 to 25000. Therefore, it is possible to reduce the effect of surface tension in the vicinity of the corner portion of the rectangular conductor and the thickness of the insulating layer can be uniform. Furthermore, it is preferable since it is possible to suppress deterioration in breakdown voltage under hygrothermal environment. Alternatively, plural types of silicone oils having different molecule weights and different functional groups can be combined. In addition, the average primary particle diameter of the silica fine particles can be derived by using a method such as transmission electron microscopy.

The inorganic fine particles are dispersed in a range of 5 to 30 mass % with respect to the resin content of the polyamide-imide resin insulating coating material. When the dispersion amount is less than 5 mass %, pseudoplasticity is not sufficiently imparted to the insulating coating material and it is not possible to suppress non-uniformity in the film thickness caused by surface tension of the coating material. On the other hand, when the dispersion amount is greater than 30 mass %, the characteristics of the insulating layer (flexibility, etc.) and coating efficiency of the coating material are deteriorated.

The insulating coating material of the invention as described above is preferable especially to be applied on a rectangular conductor to form an insulating layer in manufacturing of an insulated since the pseudoplasticity is imparted.

Next, an insulated wire of the invention will be described in conjunction with the drawings.

FIG. 1 is a cross sectional view showing an exemplary structure of an insulated wire in an embodiment of the invention.

An insulated wire 10 is composed of a conductor 1 which is of copper, aluminum etc., and has a rectangular cross sectional shape, and a polyamide-imide resin insulating layer 2 formed thereon, and is obtained by applying and baking the insulating coating material described in the embodiment around the periphery of the conductor 1.

That is, the insulated wire of the invention has, on the conductor 1, the polyamide-imide insulating layer (enamel layer) 2 formed of an insulating coating material comprising a polyamide-imide resin insulating coating material of which viscosity measured by an E-type viscometer is 1000 to 4000 mPa·s at 30° C. and at a shear rate of 200 $s^{-1}$ and is 4000 to 12000 mPa·s at 30° C. and at a shear rate of 1 $s^{-1}$.

Figure 2:
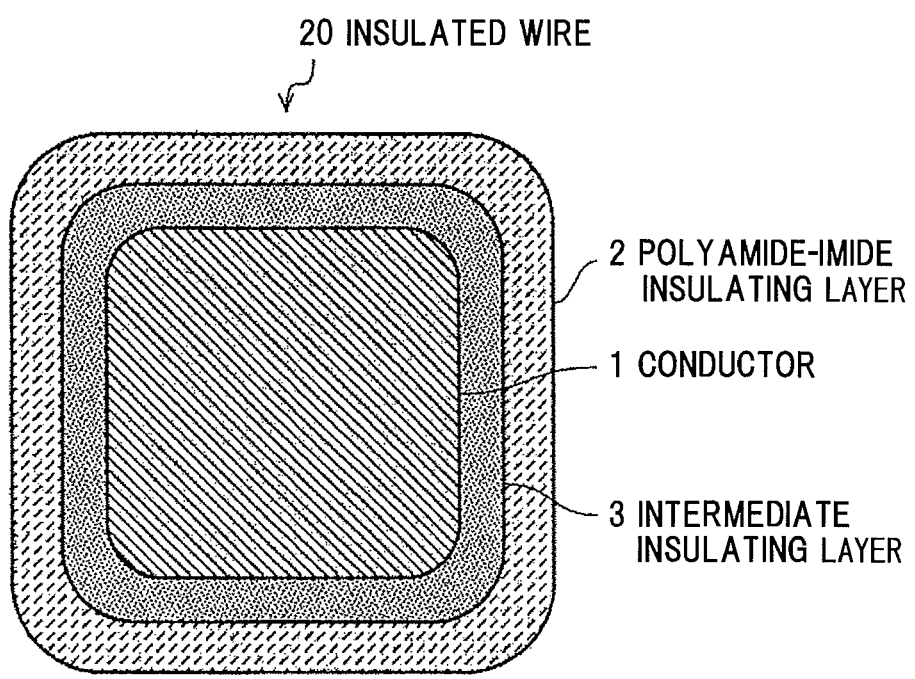
FIG. 2 is a cross sectional view showing an exemplary structure of an insulated wire in another embodiment of the invention.

Meanwhile, FIG. 2 is a cross sectional view showing an exemplary structure of an insulated wire in another embodiment of the invention.

In an insulated wire 20, an intermediate insulating layer 3 formed of a polyimide insulating coating material, a polyester resin insulating coating material, a polyester-imide resin insulating coating material or a class H polyester-imide resin insulating coating material, etc., is formed on the surface of the conductor 1, and the polyamide-imide insulating layer 2 is formed on the intermediate insulating layer 3. Alternatively, the intermediate insulating layer 3 may be a partial-discharge-resistant insulating layer formed of a partial-discharge-resistant insulating coating material having a high partial discharge inception voltage.

In the insulated wires 10 and 20 of the invention, since pseudoplasticity is imparted to the insulating coating material used for forming the polyamide-imide resin insulating layer 2, throwing power and film thickness of the coating material around the conductor can be uniform and formation of portions having a low dielectric breakdown voltage can be suppressed.

Although the corner portion of the conductor 1 in the insulated wires 10 and 20 has an arc-shape in a cross section, the invention is not limited thereto. In addition, it is possible to use copper or aluminum, etc., as a material of the conductor 1, and low-oxygen copper or oxygen-free copper may be also used. Alternatively, a highly lubricating insulating layer may be formed on an outer periphery of the polyamide-imide resin insulating layer 2 by applying a resin coating material formed by adding a lubricant agent such as carnauba wax to a base resin.

In sum, in the insulating coating material of the invention, surface-treated inorganic fine particles are dispersed in the polyamide-imide resin insulating coating material so that viscosity measured by an E-type viscometer is 1000 to 4000 mPa·s at 30° C. and at a shear rate of 200 $s^{-1}$ and is 4000 to 12000 mPa·s at 30° C. and at a shear rate of 1 $s^{-1}$, thereby imparting pseudoplasticity to the polyamide-imide resin insulating coating material.

As a result, a periphery of a rectangular conductor in which round chamfering R at the corner portion is, e.g., not more than 0.3 mm can be uniformly coated with the insulating layer with a uniform thickness (an insulating layer having a thickness with an error within ±20%).

In addition, the insulated wire having the insulating layer formed of the insulating coating material of the invention does not have uneven film thickness even when used for a rectangular conductor, and it is possible to provide a high quality insulated wire without low breakdown voltage portions.

Examples of the invention will be described below.

Insulated Coating Material and Method of Manufacturing Insulated Wire

Insulating coating materials and insulated wires in Examples and Comparative Examples were respectively made as follows.

(1) Method of Preparing Polyamide-Imide Resin Insulating Coating Material in Examples 1 to 4

Firstly, 451.1 g portion of 2,2-bis[4-(4-aminophenoxy)phenyl]propane (BAPP) as an aromatic diamine component was mixed with 453.9 g portion of trimellitic anhydride (TMA) as an acid component in a reactor provided with a stirrer, a reflux cooling tube, a nitrogen inlet tube and a thermometer, and then, 2542.1 g portion of N-methyl-2-pyrrolidone (NMP) as an organic solvent and 254.2 g portion of xylene as an azeotropic solvent were added thereto and the reaction was carried out at a stirring revolution of 180 rpm, at a nitrogen flow rate of 1 L/min and at an inside system temperature of 180° C. for 4 hours. The water and xylene produced during the dehydration reaction once accumulated in a receiver, and were appropriately distilled away from the system.

Subsequently, after cooling to 90° C., 319.7 g portion of 4,4'-diphenylmethane diisocyanate (MDI) as an aromatic diisocyanate component was mixed and the reaction was carried out at the stirring revolution of 150 rpm, at the nitrogen flow rate of 0.1 L/min and at the inside system temperature of 120° C. for 1 hour. Subsequently, 89.3 g portion of benzyl alcohol and 635.4 g portion of N,N-dimethylformamide (DMF) were mixed to terminate the reaction. A polyamide-imide resin insulating coating material with viscosity of 2000 mPa·s measured by an E-type viscometer was obtained.

(2) Preparation of Polyamide-Imide Resin Insulating Coating Materials in Comparative Examples 1 and 2

Firstly, 255.0 g portion (1.02 mole) of MDI as an isocyanate component, 192.0 g portion (1 mole) of TMA as an acid component and 630 g portion of NMP as a solvent were introduced into a flask provided with a stirrer, a reflux cooling tube, a nitrogen inlet tube and a thermometer, were then heated to 140° C. for about 1 hour while stirring in a nitrogen atmosphere. Synthesis was carried out by reacting at this temperature for 2 hours so that a polyamide-imide resin solution having an average molecular weight of about 25000 is obtained, and methanol was then introduced to cap the terminal ends and to thereby terminate the synthesis reaction. DMF (N,N-dimethylformamide) was used to dilute after standing to cool, and a polyamide-imide resin insulating coating material having a resin concentration (non-volatilized portion) of about 30 mass % was thus obtained.

A NMP dispersion liquid obtained by adding a pseudoplasticity-imparting agent to NMP was then added to the polyamide-imide resin insulating coating materials in Examples 1 to 4 and Comparative Example 1 which were obtained by the preparation method described above, the coating material was pre-stirred until the entire homogeneousness is obtained and was subsequently dispersed using Dinomill, thereby obtaining an insulating coating material.

Then, each of the obtained insulating coating materials was applied and baked on a copper conductor having a rectangular cross section of 1.0 mm×5.0 mm and R at the corner portion of 0.3 mm so as to form a 0.030 mm-thick insulating layer, thereby obtaining insulated wires. The obtained insulated wires were evaluated for uniformity of insulating layer (uneven thickness and pinhole), flexibility and breakdown voltage (breakdown voltage when being immersed in glycerin and that after hygrothermal aging).

Here, the pseudoplasticity-imparting agent used for each Example and Comparative Example and the dispersion amount thereof are shown below.

EXAMPLE 1

Silica fine particles (inorganic fine particles) surface-treated with silicone oil having an average molecular weight of 2000 were dispersed in NMP by using a dispersing system and a NMP dispersion liquid was thus obtained. The dispersion liquid was added so that the content of the silica fine particle is 5 mass % with respect to the resin content of the polyamide-imide resin insulating coating material, thereby obtaining an insulating coating material.

EXAMPLE 2

Silica fine particles (inorganic fine particles) surface-treated with silicone oil having an average molecular weight of 4000 were dispersed in NMP by using a dispersing system and a NMP dispersion liquid was thus obtained. The dispersion liquid was added so that the content of the silica fine particle is 5 mass % with respect to the resin content of the polyamide-imide resin insulating coating material, thereby obtaining an insulating coating material.

EXAMPLE 3

Silica fine particles (inorganic fine particles) surface-treated with silicone oil having an average molecular weight of 25000 were dispersed in NMP by using a dispersing system and a NMP dispersion liquid was thus obtained. The dispersion liquid was added so that the content of the silica fine particle is 5 mass % with respect to the resin content of the polyamide-imide resin insulating coating material, thereby obtaining an insulating coating material.

EXAMPLE 4

Silica fine particles (inorganic fine particles) surface-treated with silicone oil having an average molecular weight of 4000 were dispersed in NMP by using a dispersing system and a NMP dispersion liquid was thus obtained. The dispersion liquid was added so that the content of the silica fine particle is 30 mass % with respect to the resin content of the polyamide-imide resin insulating coating material, thereby obtaining an insulating coating material.

COMPARATIVE EXAMPLE 1

Non-surface-treated silica fine particles (inorganic fine particles) were dispersed in NMP by using a dispersing system and an NMP dispersion liquid was thus obtained. The dispersion liquid was added so that the content of the silica fine particle is 5 mass % with respect to the resin content of the polyamide-imide resin insulating coating material, thereby obtaining an insulating coating material.

COMPARATIVE EXAMPLE 2

An insulating coating material was obtained from a polyamide-imide resin insulating coating material to which an inorganic fine particle is not added.

Following tests and evaluations were conducted for the insulated wires in Examples 1 to 4 and Comparative Examples 1 and 2 which were prepared as described above.

(1) Measurement of Uneven Thickness (Evaluation for Uniformity of Insulating Layer)

Thickness of the insulating layer was measured by a method conforming to JIS C 3003, and unevenness in thickness was calculated from a difference in thickness of the insulating layer between a thin portion and a thick portion.

(2) Pinhole Measurement (Evaluation for Uniformity of Insulating Layer)

The pinhole measurement was conducted by a method conforming to JIS C 3003, and the number of pinholes generated in the insulating layer was measured.

(3) Flexibility Test

In the flexibility test, an insulated wire which is not elongated was wound around a winding bar having a diameter 1 to 10 times the conductor diameter of the insulated wire by a method conforming to JIS C 3003, and the minimum winding diameter (d) at which generation of cracks on the insulating layer is not observed by an optical microscope was measured. In this case, the insulated wire in which the minimum winding diameter (d) with no generation of cracks on the insulation layer is not more than 4 d were judged as "Passed".

(4) Breakdown Voltage Measurement by Glycerin Immersion

In the breakdown voltage measurement by glycerin immersion, two test pieces of which insulating layer at both ends is removed were folded in two and portions of about 12 mm length were twisted 9 times while applying about 15N of tension, then, the tension was removed and the test pieces were cut at the folded line, thereby obtaining a test piece of a twisted pair wire. Subsequently, the test piece was immersed into a solution composed of 85% of glycerin and 15% of saturated saline, an alternating voltage of AC 50 Hz was applied and was increased at a rate of 500V/sec, and the voltage at which breakdown occurred was defined as the breakdown voltage.

(5) Breakdown Voltage Measurement by Glycerin Immersion after Hygrothermal Aging In the breakdown voltage measurement by glycerin immersion after hygrothermal aging, two test pieces of which insulating layer at both ends is removed were folded in two and portions of about 12 mm length were twisted 9 times while applying about 15N of tension, then, the tension was removed and the test pieces were cut at the folded line, thereby obtaining a test piece of a twisted pair wire. Subsequently, the test piece of the twisted pair wire was put in a test tube containing 1.2 ml of water and the tube was sealed and left at 120° C. for 14 days. After that, the test piece of the twisted pair wire was taken out from the test tube and was immersed into a solution composed of 85% of glycerin and 15% of saturated saline, an alternating voltage of AC 50 Hz was applied and was increased at a rate of 500V/sec, and the voltage at which breakdown occurred was defined as the breakdown voltage.

(6) Partial Discharge Inception Voltage Measurement

The partial discharge inception voltage was measured by the following procedure. Two 500 mm-wires were respectively cut out from the insulated wires in Examples and Comparative Examples and were twisted together while applying 14.7N (1.5 kgf) of tension, and 10 respective twisted pair samples each having a portion twisted 9 times within 120 mm in a middle portion were made. The insulating covering layer of the sample was peeled 10 mm at an end portion by an abisofix apparatus. Then, the sample was kept in a constant-temperature oven at 120° C. for 30 minutes in order to dry an insulating covering layer and was left in a desiccator for 18 hours until room temperature. The partial discharge inception voltage was measured by a partial discharge automatic test system. In an atmosphere at 25° C. and a relative humidity (RH) of 50%, sinusoidal voltage of 50 Hz was applied to the sample of the twisted pair wire while increasing the voltage at a rate of 10 to 30 V/s. Voltage at which 100 pC of discharge occurs 50 times per second in the sample of the twisted pair wire was measured. The measurement was repeated three times and each average measured value was defined as a partial discharge inception voltage.

(7) Surge Resistance Test

Samples of the twisted pair wire were made from the respective insulated wires in Examples and Comparative Examples, voltage of 900V (10 kHz) was applied between two samples of the twisted pair wires, and time to occurrence of breakdown was measured.

Table 1 shows blending ratios of respective components and characteristics, etc., of the obtained insulating coating materials and insulated wires (viscosity of insulating coating material, uniformity of insulating layer, flexibility, breakdown voltage, partial discharge inception voltage and surge resistance) in Examples and Comparative examples.

TABLE 1

| | | | Example 1 | Example 2 | Example 3 | Example 4 | Comparative Example 1 | Comparative Example 2 |
|---|---|---|---|---|---|---|---|---|
| Composition of polyamide-imide resin insulating coating material (g) | Aromatic diisocyanate component | MDI | | | 319.7 | | | 255 |
| | Aromatic diamine component | BAPP | | | 451.1 | | | 0 |
| | Acid component | TMA | | | 453.9 | | | 192 |
| | Solvent | NMP | | | 2542.1 | | | 630 |
| | Sealant | Benzyl alcohol | | | 89.3 | | | 0 |
| | Diluting solvent | DMF | | | 635.4 | | | 250 |

TABLE 1-continued

| | | Example 1 | Example 2 | Example 3 | Example 4 | Comparative Example 1 | Comparative Example 2 |
|---|---|---|---|---|---|---|---|
| Pseudoplasticity imparting agent | added or not | added | added | added | added | added | not added |
| | Molecule weight of silicone oil for surface treatment | 2000 | 4000 | 25000 | 4000 | No surface treatment | — |
| | Added amount with respect to resin content (%) | 5 | 5 | 5 | 30 | 5 | — |
| | Average primary particle diameter of silica fine particle (nm) | 12 | 12 | 12 | 12 | 12 | — |
| Viscosity of polyamide-imide resin insulating coating material measured by an E-type viscometer at 30° C. and at a shear rate of 200 s$^{-1}$ (mPa·s) | | 2000 | 2000 | 1000 | 4000 | 2000 | 2500 |
| Viscosity of polyamide-imide resin insulating coating material measured by an E-type viscometer at 30° C. and at a shear rate of 1 s$^{-1}$ (mPa·s) | | 8000 | 6000 | 4000 | 12000 | 3000 | 2500 |
| Characteristics of Insulated wire | Uniformity of insulating layer — Uneven thickness (Max. film thickness/Min. film thickness) | 1.25 | 1.25 | 1.25 | 1.10 | 1.60 | 1.78 |
| | 5m pinhole (number) | 0 | 0 | 0 | 0 | 5 | 4 |
| | Flexibility — Edgewise bending with 4 times diameter | Passed | Passed | Passed | Passed | Passed | Passed |
| | Dielectric breakdown voltage — When immersed in glycerin (kV) | 6.5 | 6.5 | 6.5 | 7.0 | 3.2 | 3.3 |
| | When immersed in glycerin after hygrothermal aging (kV) | 6.6 | 6.6 | 6.6 | 7.0 | 1.3 | 3.2 |
| | Partial discharge inception voltage — 25° C. × 50% RH, 50 Hz, detection sensitivity of 100 pC (Vp) | 1080 | 1080 | 1080 | 1050 | 870 | 870 |
| | Surge resistance — Applied voltage 900 Vp (hr) | >1000 | >1000 | >1000 | >1000 | 400 | 2 |

As shown in Table 1, in Examples 1 to 4, the insulating coating material was uniformly applied when forming a polyamide-imide resin insulating layer on a conductor and a thin portion is not present in the layer, and thus, low unevenness in thickness and high breakdown voltage were obtained. In addition to this, in Examples 1 to 4, a decrease in breakdown voltage after hygrothermal aging was suppressed by using a silica fine particle which is surface-treated with silicone oil. As a result, it is possible to provide a rectangular insulated wire having a polyamide-imide resin insulating layer in which throwing power of layer to a rectangular conductor is uniform and characteristics are satisfactory.

On the other hand, in Comparative Example 1, when forming the polyamide-imide insulating layer on the conductor, the effect of surface tension cannot be reduced due to small pseudoplasticity and a small increase in viscosity after passing through a coating die since the silica fine particle is not surface treated, which causes highly uneven thickness and leads to a decrease in breakdown voltage and generation of pinholes. Furthermore, the layer on the enameled wire is hydrolyzed by hygrothermal aging due to low water resistance and the breakdown voltage thus decreases.

In Comparative Example 2 in which the pseudoplasticity-imparting agent is not added, the effect of surface tension cannot be reduced since viscosity after passing through the coating die is not increased, which causes highly uneven thickness and leads to a decrease in breakdown voltage and generation of pinholes.

The invention has an effect that the coated layer keeps the shape of the coating die when the insulating layer is formed on a rectangular conductor since the pseudoplasticity imparted to the coating material makes viscosity of the coating material low during application of a shearing force to the coating material by the coating die and then high immediately after passing through the coating die due to reduction in shearing, which suppresses unevenness of the coating material and allows a high quality insulating layer without unevenness in film thickness to be obtained, and the time until the throwing power of the coated layer becomes non-uniform is longer than the coating material to which pseudoplasticity is not imparted, and thus, the layer can be formed by baking in a hardening furnace while the coated layer is still uniform. Therefore, it is possible to from a uniform layer even on a rectangular conductor. In addition, it is possible to suppress a decrease in characteristics (mechanical characteristics) as an insulated wire, such as flexibility. Therefore, it is possible to provide a polyamide-imide resin insulating coating material useful for industrial applications and a rectangular insulated wire using thereof.

Although the embodiments of the invention have been described, the invention according to claims is not to be limited to the above-mentioned embodiments. Further, please note that all combinations of the features described in the embodiments are not necessary to solve the problem of the invention.

What is claimed is:

1. An insulating coating material, comprising:
   a polyamide-imide resin insulating coating material; and
   surface-treated inorganic fine particles dispersed in the polyamide-imide resin insulating coating material;
   wherein the viscosity of the insulating coating material measured by an E-type viscometer is 1000 to 4000 mPa·s at 30° C. and at a shear rate of 200 s$^{-1}$ and 4000 to 12000 mPa·s at 30° C. and at a shear rate of 1 s$^{-1}$; and
   wherein the inorganic fine particles comprise a silica fine particle and wherein the Inorganic fine particles are surface-treated with silicone oil having a molecule weight of 2000 to 25000.

2. The insulating coating material to claim 1, wherein the inorganic fine particles are dispersed in a range of 5 to 30 mass % with respect to a resin content of the polyamide-imide resin insulating coating material.

3. The insulating coating material according to claim 1, wherein the silica fine particle has an average primary particle diameter of less than 50 nm and dispersed at a ratio of 5 to 25 parts by mass per 100 parts by mass of the polyamide-imide resin.

4. The insulating coating material according to claim 1, wherein the polyamide-imide resin insulating coating material comprises an organic solvent, and a polyamide-imide resin obtained by reacting an aromatic diamine component comprising aromatic diamine having three or more aromatic rings with an aromatic diisocyanate component and an acid component including aromatic tricarboxylic acid anhydride.

5. An insulated wire, comprising:
   a rectangular conductor; and
   an insulating layer formed on the rectangular conductor and comprising the insulating coating material of claim 1.

* * * * *